(12) United States Patent
Li et al.

(10) Patent No.: US 10,204,090 B2
(45) Date of Patent: Feb. 12, 2019

(54) VISUAL RECOGNITION USING SOCIAL LINKS

(71) Applicant: OATH INC., New York, NY (US)

(72) Inventors: Jia Li, Santa Clara, CA (US); Xiangnan Kong, Chicago, IL (US)

(73) Assignee: OATH INC., New York, NY (US)

( * ) Notice: Subject to any disclaimer, the term of this patent is extended or adjusted under 35 U.S.C. 154(b) by 14 days.

(21) Appl. No.: 15/651,822

(22) Filed: Jul. 17, 2017

(65) Prior Publication Data

US 2018/0004719 A1    Jan. 4, 2018

Related U.S. Application Data

(63) Continuation of application No. 14/215,925, filed on Mar. 17, 2014, now Pat. No. 9,710,447.

(51) Int. Cl.
| | |
|---|---|
| *G06F 17/20* | (2006.01) |
| *G06F 17/24* | (2006.01) |
| *G06F 17/30* | (2006.01) |
| *G06K 9/00* | (2006.01) |
| *G06K 9/62* | (2006.01) |

(52) U.S. Cl.
CPC ...... *G06F 17/241* (2013.01); *G06F 17/30598* (2013.01); *G06K 9/00677* (2013.01); *G06K 9/6296* (2013.01)

(58) Field of Classification Search
CPC ............ G06F 17/241; G06F 17/30598; G06K 9/00677; G06K 9/6296
See application file for complete search history.

(56) References Cited

U.S. PATENT DOCUMENTS

| | | | |
|---|---|---|---|
| 2011/0038512 A1* | 2/2011 | Petrou ............... | G06F 17/30256 382/118 |
| 2011/0276396 A1* | 11/2011 | Rathod ............. | G06F 17/30867 705/14.49 |
| 2015/0033362 A1* | 1/2015 | Mau ................... | G06K 9/00288 726/27 |
| 2015/0186420 A1* | 7/2015 | Yan .................. | G06F 17/30268 707/736 |
| 2015/0186538 A1* | 7/2015 | Yan .................. | G06F 17/30268 707/722 |
| 2015/0244794 A1* | 8/2015 | Poletto ................ | H04L 67/1085 715/748 |

(Continued)

*Primary Examiner* — Mohammed H Zuberi (74) *Attorney, Agent, or Firm* — James J. DeCarlo; Greenberg Traurig, LLP (57) ABSTRACT

System, method and architecture for providing improved visual recognition by modeling visual content, semantic content and an implicit social network representing individuals depicted in a collection of content, such as visual images, photographs, etc., which network may be determined based on co-occurrences of individuals represented by the content, and/or other data linking the individuals. In accordance with one or more embodiments, using images as an example, a relationship structure may comprise an implicit structure, or network, determined from co-occurrences of individuals in the images. A kernel jointly modeling content, semantic and social network information may be built and used in automatic image annotation and/or determination of relationships between individuals, for example.

20 Claims, 9 Drawing Sheets

(56) References Cited

U.S. PATENT DOCUMENTS

| | | | |
|---|---|---|---|
| 2015/0332336 A1* | 11/2015 | Hong | G06Q 30/02 |
| | | | 705/14.66 |
| 2016/0034459 A1* | 2/2016 | Larsen | G06F 17/30044 |
| | | | 707/740 |
| 2017/0078621 A1* | 3/2017 | Sahay | G06F 17/2229 |
| 2017/0083599 A1* | 3/2017 | Bostick | G06F 17/30598 |
| 2017/0139925 A1* | 5/2017 | Shah | G06F 17/30029 |
| 2017/0154314 A1* | 6/2017 | Mones | G06Q 10/1053 |

\* cited by examiner

| Notation | Description |
|---|---|
| $D(X,Y) = \{(x_i, Y_i)\}_{i=1}^{n}$ | Denotes a multi-label dataset, D, comprising a sample set, X, and a label set, Y. |
| $X = \{x_i\}_{i=1}^{n}$ and $x_i \in \mathbb{R}^d$ | Denotes a feature vector of sample $x_i$ in the d-th dimensional input space. |
| $Y = \{Y_i\}_{i=1}^{n}$, where $Y_i = (Y_i^1, \cdots, Y_i^q) \in \{0,1\}^q$ | Denotes the multiple labels assigned to sample $x_i$. |
| $C = \{l_1, \cdots, l_q\}$ | Denotes a set of q possible label concepts. |
| $G(V, E)$ | Denotes a network, G, comprising a set, V, and edges, E. |
| $V = \{v_1, \cdots, v_n\}$ | Denotes the set of edges of network, G, and corresponds to the samples in D. |
| $X$ | Sample set comprising a training sample set, $X_L$, and a test, or unlabeled, sample set, $X_U$. |
| $X_L$ | Training sample set, in which the labels are known for each sample, $x_i$, in the training sample set. |
| $X_U$ | Test sample set, in which the labels are unknown for each sample, $x_i$, in the test sample set. |
| $y_i = (y_i^1, \cdots, y_i^q)^T \in \{0,1\}^q$ | Is a binary vector representing the observed label set assigned to sample $x_i$, $y_i^k = 1$ if the k-th label is in $x_i$'s label set. |

FIGURE 9

# VISUAL RECOGNITION USING SOCIAL LINKS

CROSS REFERENCE TO RELATED APPLICATIONS

This application is a continuation of and claims priority from co-pending U.S. patent application Ser. No. 14/215,925, filed Mar. 17, 2014, entitled VISUAL RECOGNITION USING SOCIAL LINKS, which is hereby incorporated by reference.

FIELD OF THE DISCLOSURE

The present disclosure relates to visual recognition and more particularly to harnessing the social network of individuals identified from one or more image collections, via a multiple kernel learning model to process unlabeled images, including identifying one or more annotations for such images and/or identifying relationships between individuals appearing in such images.

BACKGROUND

Visual recognition performed on image content has been quite useful in a number of applications, such as robust object detectors, image classifiers, image retrieval and image annotation. However, there is a vast amount of additional data that image content visual recognition ignores. It would be beneficial to be able to use information other than the data gathered from image content using visual recognition,

SUMMARY

The present disclosure seeks to address failings in the art and to provide an improved visual recognition by modeling visual content, semantic content and social relationship structure(s). In accordance with one or more embodiments, a social relationship structure may comprise an implicit social structure, or network, determined from one or more image collections. Embodiments of the present disclosure may be used in automatic image tagging, image retrieval and/or classification. For example, relationships may be inferred based on co-occurrences of people in images. An assumption is that people who appear in the same image, or the same images, are related to some degree, which may be determined by a frequency of their co-occurrences, e.g., the number of images in which the people appear together. It is further assumed that a group of people belonging to a community, e.g., professional, locale, hobbies, familial, etc., appear together in images more often than people who are not a part of the community, or group.

Embodiments of the present disclosure provide a multilabel modeling approach takes into account content, related semantic information and social network structure. Relationships between content, semantic and social network features of content items are modeled and a joint kernel is trained using trained content, semantic and social network kernels and a convex combination of these kernels, such as and without limitation determining kernel weights, is learned. In accordance with one or more embodiments, a multiple kernel learning (MKL) framework may be used to build the joint kernel. By way of a non-limiting example, individuals that are connected in a social network identified in accordance with one or more embodiments of the present disclosure are more likely than not have similar content and use similar annotations for their content. A social network component of a joint kernel may be used in identifying annotations for content items shared by individuals related in the social network, which social network is identified using content items in accordance with one or more embodiments of the present disclosure. The joint kernel, which models interrelationships between content, semantic and social network features, may be used to, for example and without limitation, identify one or more annotations for one or more content items, make one or more content item recommendations, identify one or more advertisement(s) for one or more individuals, etc.

In accordance with one or more embodiments, a method is provided, the method comprising training, by at least one computing device, a kernel jointly modeling content, semantic and social network information of a training set comprising a plurality of content items, each content item of the plurality having associated content, semantic and social network feature information used in training the kernel; and identifying, by the at least one computing device, one or more annotations for at least one test content item other than the plurality of content items used to train the kernel, the trained kernel and the content item's content feature information are used to identify the one or more annotations.

In accordance with one or more embodiments a system is provided, which system comprises at least one computing device comprising one or more processors to execute and memory to store instructions to train a kernel jointly modeling content, semantic and social network information of a training set comprising a plurality of content items, each content item of the plurality having associated content, semantic and social network feature information used in training the kernel; and identify one or more annotations for at least one test content item other than the plurality of content items used to train the kernel, the trained kernel and the content item's content feature information are used to identify the one or more annotations.

In accordance with yet another aspect of the disclosure, a computer readable non-transitory storage medium is provided, the medium for tangibly storing thereon computer readable instructions that when executed cause at least one processor to train a kernel jointly modeling content, semantic and social network information of a training set comprising a plurality of content items, each content item of the plurality having associated content, semantic and social network feature information used in training the kernel; and identify one or more annotations for at least one test content item other than the plurality of content items used to train the kernel, the trained kernel and the content item's content feature information are used to identify the one or more annotations.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 5, comprising

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a system, method and architecture for providing improved visual recognition by modeling visual content, semantic content and social, or other, relationship structure(s), which structures) may be determined based on co-occurrences of people in visual content, such as photographs. In accordance with one or more embodiments, using images as an example, a relationship structure may comprise an implicit structure, or network, determined from one or more image collections.

In accordance with one or more embodiments, a multi-label classification is performed that is based on multi-kernel learning, which jointly models content, semantic and social network information.

A kernel may be characterized by a function and may be used to classify an object based on the object's features. A kernel may be learned, or trained, using a training data set of object samples, each sample having a set of features, which are used to classify each sample. A set of features may be represented as a feature vector comprising a number of bits, each of which corresponding to a feature; each bit's value may indicate whether or not the Object has the feature. By way of a non-limiting example, a value of 1 for a bit indicates that the object has the feature represented by the bit and a value of 0 indicates that the object does not have the feature. Once trained, a kernel function may be used to classify an object using the object's features, e.g., the feature vector may map the object to a feature space and the kernel function may be used to indicate a class of objects to which the object is considered to be similar. In so doing, it is possible to classify an object based on the object's features and a trained kernel function. In some cases, a kernel function may be used as a classifier indicating whether an object is or is not a member of a class of objects, e.g., a class of objects used to train the kernel. A kernel function may indicate whether an object is or is not a member of more than one class, which may be referred to as multi-label classification.

In accordance with one or more embodiments, content information that may be modeled may comprise information about, e.g., features of, content objects. In a case of a visual object, the content features may comprise information such as texture, color, shape(s), etc. Semantic information may comprise information or expressions about the meaning of the object. In a case of a visual object, such information may be in the form of metadata, which may comprise annotations, or tags. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, and the like.

Network information may comprise information about a network comprising nodes, each of which may correspond to an individual, and edges, which corresponds to links, or relationships, among individuals, groups of individuals, etc.

One example of a visual object that is used herein is an image, or photograph. It should be apparent that any type of content may be used in connection with embodiments of the present disclosure. By way of some non-limiting examples, the content may comprise one or both of visual and audio content, may be a photograph, streaming media, etc.

Embodiments of the present disclosure may be used in automatic image tagging, or annotation. Embodiments of the present disclosure may further be used in image retrieval and/or classification.

In accordance with one or more embodiments, relationships between people may be inferred based on co-occurrences of people in images. People who appear in the same image, or the same images, may be assumed to be related in some manner and to some degree. A degree to which people are related, e.g., a strength of relationship between people, may be determined by a frequency of their co-occurrences, e.g., the number of images in which the people appear together. It is further assumed that a group of people belonging to a community, e.g., professional, locale, hobbies, familial, etc. community, appear together in images more often than people who are not a part of the community, or group; and people may belong to multiple communities.

A network of people, which may wholly or partially inferred from co-occurrences of people in images, may be used in conjunction with visual and semantic information to train a model. The model may comprise a multi-kernel, model that may be used to provide improved visual recognition and make predictions regarding the visual content, semantic content relationships among individuals depicted in content, such as visual images, photographs, etc. Relationships, or links may be identified based on co-occurrences of individuals in the content, and/or other data linking the individuals.

In accordance with one or more embodiments, a plurality of images may be used to construct a network representing individuals and their relationships, and may be further used to identify, or form, communities comprising a number of individuals. Inferences may be made about individuals based on their co-occurrences in an image, or images. Individuals may be assumed to belong to a given community, or grouping of individuals; individuals that are considered to belong to a community are more likely to appear together more frequently in images related to the community that individuals not part of the community. At the same time, one person could belong to multiple communities. For example and assuming two communities, a vision research community and a cooking community, a person that is a computer vision research professional might also be interested in cooking as a hobby, and that person may belong to both the computer vision researcher community and the cooking community.

In accordance with one or more embodiments, a clique percolation method may be used to discover communities of people and/or overlapping communities. In accordance with one or more embodiments, a network, which may also be referred to herein as a social network, as well as one or more communities and/or overlapping communities, may be identified as disclosed in commonly-owned, U.S. application Ser. No. 13/951,078, filed Jul. 25, 2013, entitled System and Method For Content Based Social Recommendations And Monetization Thereof; the entire contents of which are incorporated herein by reference. More particularly, each image in a collection of images may be electronically processed, e.g., using one or more facial recognition algorithms or other known or to be known recognition algorithms, to recognize one or more people within each image. A person's identify may be verified using information, such as demographic information, age, gender, biometric, and other types of information derivable from such image and facial recognition processing, or extracted from a user's profile, as understood by those of skill in the art. A connection strength between recognized persons may be determined. As disclosed herein, the strength may be based on the number of times that two persons appear together in an image, e.g., the number of images in which the two persons appear together. Application of a clique percolation algorithm, in some embodiments, allows for detecting k-clique communities comprising two or more individuals. Of course, it should be apparent that any technique now known or later developed may be used to identify a community, individuals belonging to a community, or communities, and/or one or more overlapping communities.

A social network may be compiled, or built, based on individuals identified in a collection of images. In accordance with one or more embodiments, a link may be created between two individuals that appear together in an image, and a connection strength may be associated with each link. Social communities, or communities, some of which may overlap, may be detected, which may server to group individuals.

Figure 1:
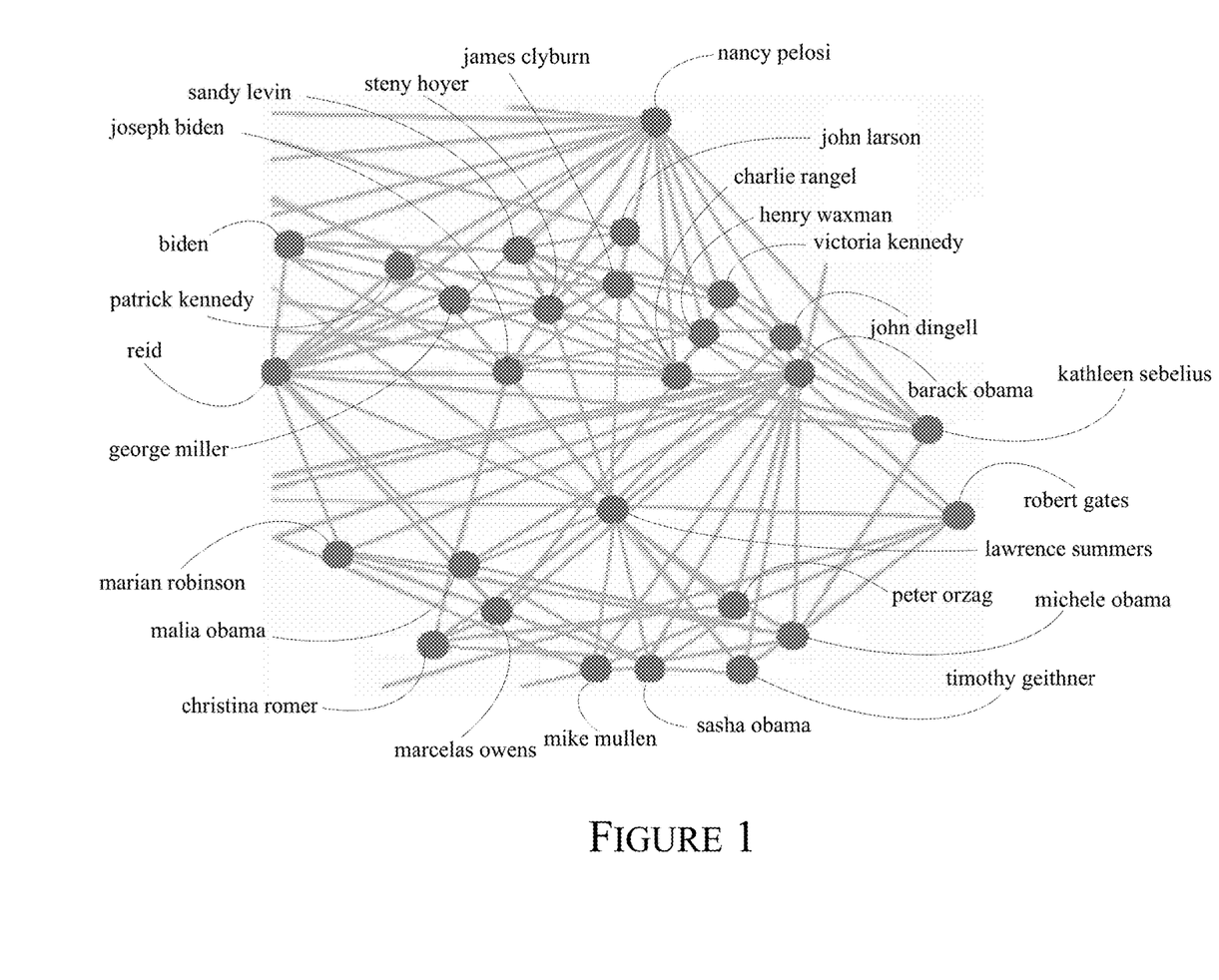
FIGS. 1 and 2 provide a graphic illustration of a social network, comprising nodes, links between nodes and communities, for use in connection with one or more embodiments of the present disclosure.
Figure 2:
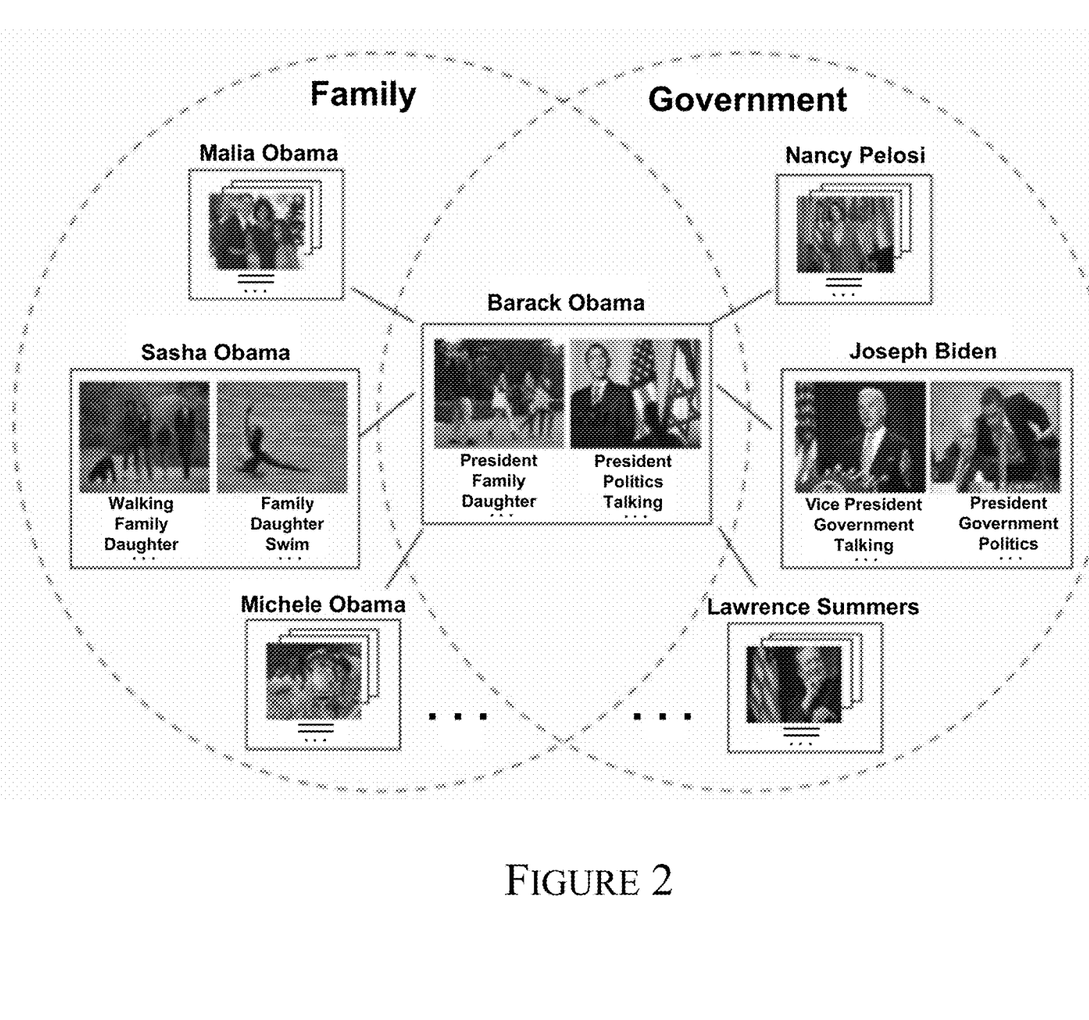

FIGS. 1 and 2 provide a graphic illustration of a social network, comprising nodes, links between nodes and communities, for use in connection with one or more embodiments of the present disclosure.

In the example social network shown in FIG. 1, each node, or circle, represents a person, or individual, and each edge, or line, connecting two circles represents a link, or relationship, between two individuals in the network. In the example shown, Barack Obama is linked to a number of other individuals in the network, including, Michele Obama, Malia Obama, Sasha Obama, Marian Robinson, Joe Biden, Nancy Pelosi, Harry Reid, to name a few. The people belonging to a network, such as in the example shown in FIG. 1, may be connected in a certain context, or contexts, such as and without limitation, a hobby, an interest, a profession, a family, an employer, etc. Two communities may be said to be overlapping based on the occurrence of one or more persons belonging to both communities.

In FIG. 2, overlapping communities are depicted. In the example depicted, each person has a set of photos and each photo may have one or more related annotations, or tags. In the example shown, each of the circles corresponds to a community, and each community may comprise a grouping that includes a number of individuals. The communities, or groups, may be established automatically based on behavior, interests, etc. of people, which may be identified using information including the tags associated with the photos, demographic information, as well as explicit information, such as information expressly provided by one or more the individuals, implicit information, such as information collected from observing behavior of the individual(s). Behavior that may be observed includes without limitation an individual's online behavior, such as and without limitation browsing behavior, searching behavior, purchasing behavior, etc.

By way of some non-limiting examples, a community may be formed that includes individuals who share similar properties, such as colleagues, classmates, people who share similar demographic information, etc. People may elect to form, or join, a community. It should be apparent that any approach now known or later developed for identifying one or more communities and/or overlaps in two or more communities may be used in connection with embodiments of the present disclosure.

In the example shown in FIG. 2, various individuals, and links between these individuals, may be identified from images, and such individuals and links may be used to form a network. The images used to form the network may include annotations, metadata, etc. that may be used to identify individuals and/or other components of the network. In the example, images that depict Barack Obama identify the President as part of the network with links to various individuals, including family members and members hold governmental positions. Two communities are shown, a family community and a government community. The President is part of both the family and the government communities. The two communities may be said to overlap by virtue of the President's membership in both communities.

In accordance with one or more embodiments, images, e.g., photographs, such as may be found in one or more image databases, may be used to construct a network, such as the network shown in FIGS. 1 and 2. The images used in constructing the network may be considered to encode implicit relationships between people. That is, people who are related to each other usually appear together in photographs; and, the more photographs that people appear in together, the stronger the relationship may be said to be.

In accordance with at least one embodiment, the network, e.g., an implicit, inferred or latent, network, which may be constructed for example from image content, comprises a plurality of nodes, each of which may represent an individual, e.g., an individual appearing in a photograph, and a plurality of links, each of which links two individuals appearing in the same image. Each link may have a value that represents the strength of the relationship, or link, between two individuals. By way of a non-limiting example, the value may be the frequency with which the two individuals appear in the same images, e.g., the number of images in which the two individuals appear together.

In accordance with one or more embodiments, links in a network may be created between two individuals based on similar interests, e.g., individuals interested in soccer, travel, etc. may be linked. By way of a further non-limiting example, behavior of individuals, e.g., online behavior such as and without limitation browsing, purchasing, etc. behavior. Individuals searching and/or previewing information, or images, related to soccer may be considered to have an interest in soccer, and may be linked in the network.

In accordance with one or more embodiments, a multi-kernel multi-label (MKML) kernel is generated, or trained, using a training dataset. The MKML kernel may be referred to as a joint kernel as it jointly models content, semantic and social network information. The MKML kernel may comprise content, semantic and network, or social network, kernels, each of which may be trained using information associated with a content collection, such as a collection of images, used as a training dataset. By way of a non-limiting example, each image in a collection of images uses to train the kernel may be referred to as a sample, and each sample may have content, semantic and network features, which may be used to train the MKML kernel.

In accordance with one or more embodiments, the MKML kernel may be used in, for example, image annotation and/or relationship/community identification. By way of some non-limiting examples, in a case of an unlabeled image, the MKML kernel may be used to provide one or more related annotations, and each individual depicted in the unlabeled image may be assigned to one or more communities, and/or related to one or more individuals, represented by the network.

Figure 3:
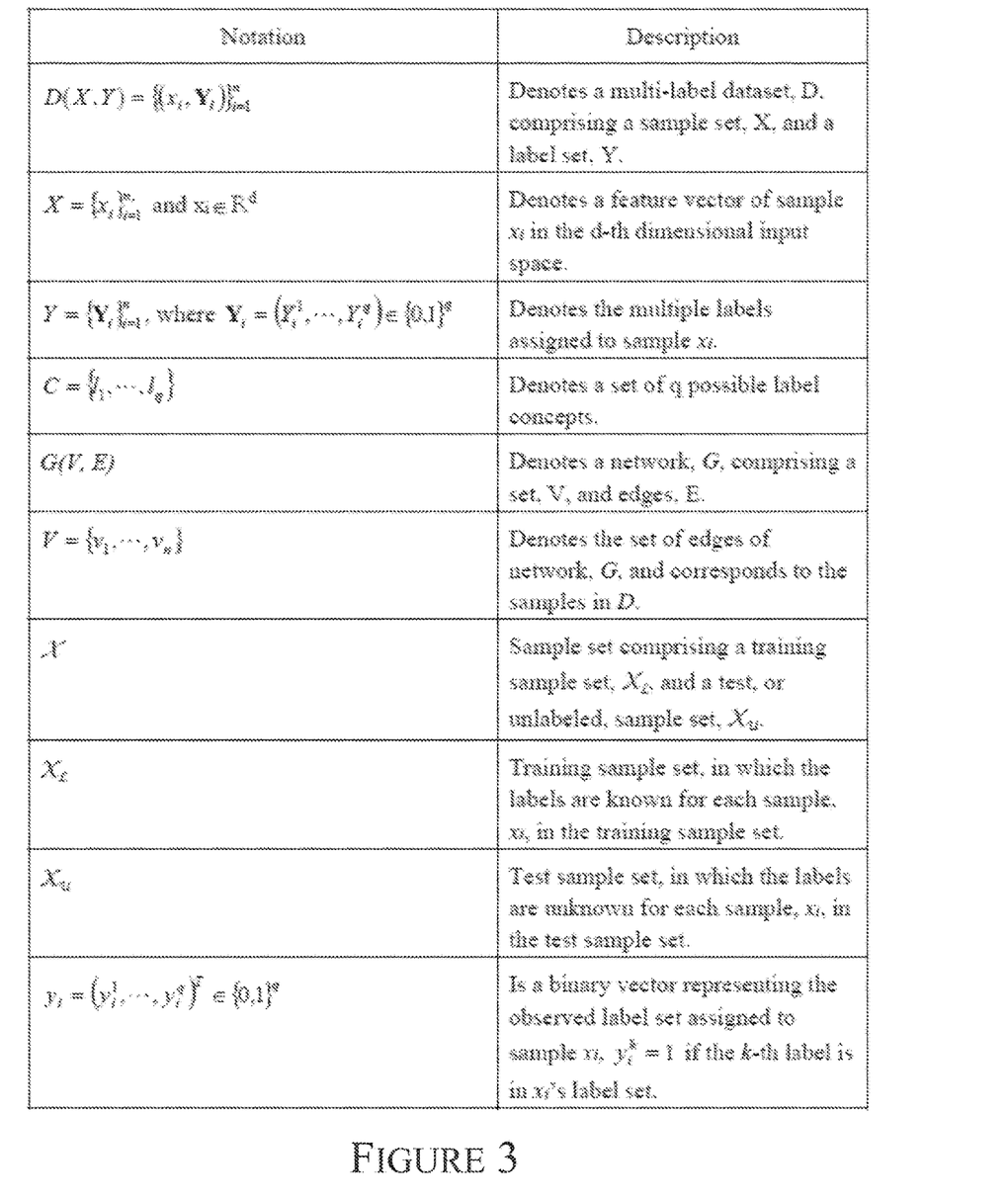
FIG. 3 provides examples of notations used herein in connection with embodiments of the present disclosure.

FIG. 3 provides examples of notations used herein in connection with embodiments of the present disclosure. Embodiments of the present disclosure use a sample set, $X_L$, of a dataset. D, which sample set comprises a plurality of samples, e.g., images, each sample, $x_i$, has a corresponding set of features represented in a feature vector, X, and a set of labels, Y. In accordance with one or more embodiments, each sample $x_i$ in the sample set, $X_L$, has a content, semantic and network feature vector. The content feature vector identifies features of the content of the image, e.g., color, texture, etc.; the semantic feature vector identifies annotations, or tags, associated with the image; and the network feature vector identifies the individual(s) appearing in the image. In accordance with one or more embodiments, for the training sample set, each sample $x_i$'s label set, Y, comprises labels, such as one or more annotations, or tags. Semantic labels may comprise metadata, e.g., tags, associated with the image.

As discussed herein, each bit in a feature vector, a content, semantic or network feature vector, may correspond to a value of 1 if the image content has the feature and 0 otherwise. In a case of a content feature vector, a value of 1 for a bit in the vector indicates that the content feature is found in the sample, $x_i$. The sample, $x_i$ has a vector representing its semantic feature set, where each bit in the vector may correspond to a semantic feature, annotation, tag, etc., with a value of 1 if the image is associated with the annotation and 0 otherwise. The sample, $x_i$, has a vector corresponding to its network feature set, where each bit in the vector may correspond to a network node representing an individual, with a value of 1 if the individual is depicted in the image and 0 otherwise.

In accordance with one or more embodiments, a multi-label classification approach is used to predict a label set for an image belonging to a set of one or more unlabeled images, e.g., an unlabeled sample set, $X_U$, and/or to predict a set of relationships among individuals. An unlabeled sample set may comprise one or more images for which one or more annotations and/or one or more relationships are to be identified using the MKML kernel. By way of a non-limiting example, an approach may predict, or infer, one or more annotations, e.g., the bit values of the sample's semantic feature vector(s), using the MKML kernel built using the labeled sample set, $X_L$, each sample in the labeled sample set comprising defined content, semantic and network feature vectors. In accordance with one or more embodiments, each unlabeled sample image has a content feature vector which is used with the MKML to identify one or more annotations and/or one or more network connections, relationships, community memberships, etc., using an iterative process.

Figure 4:
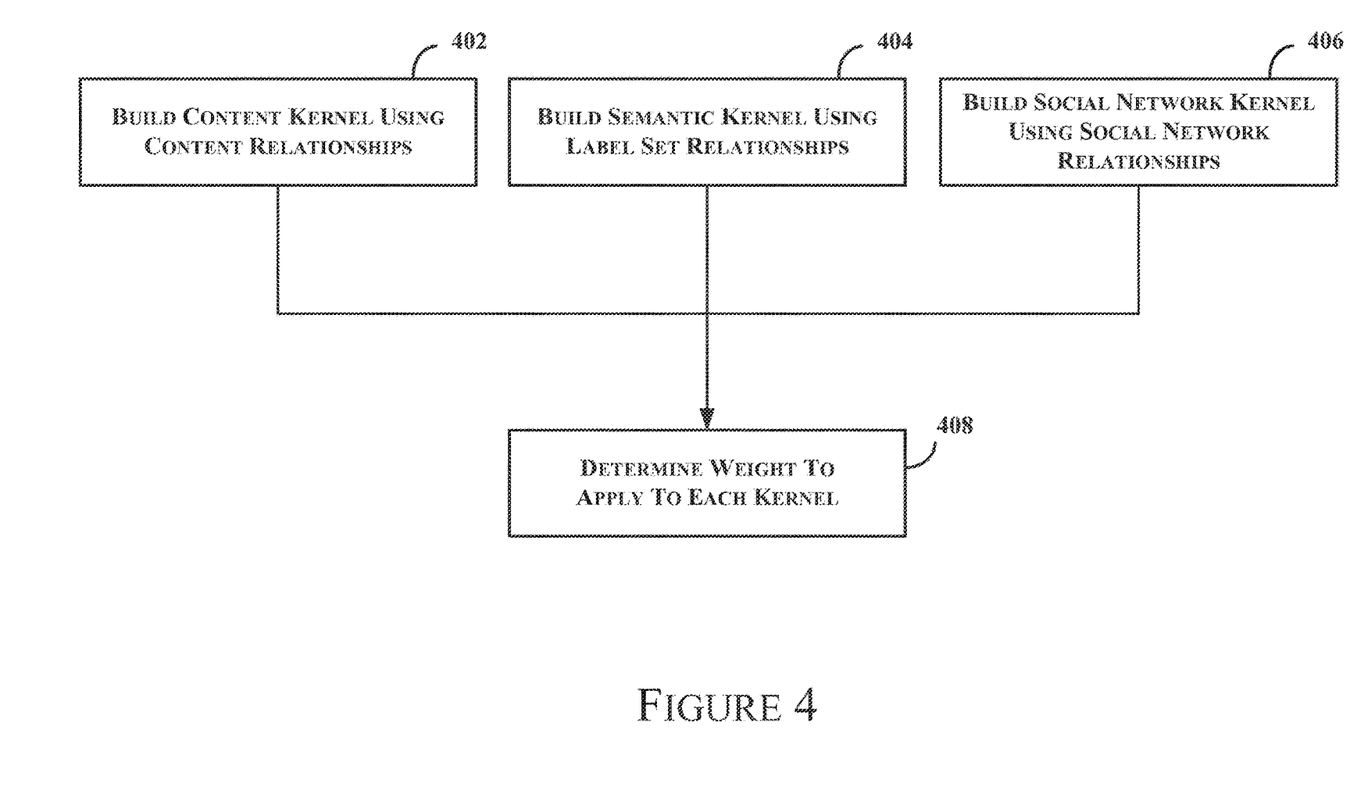
FIG. 4 provides an example of process flow for use in building a multi-kernel multi-label (MKML) in accordance with one or more embodiments of the present disclosure.

FIG. 4 provides an example of process flow for use in building a multi-kernel multi label (MKML) in accordance with one or more embodiments of the present disclosure. At step 402, a content kernel is trained, or built, using a content feature vector for each sample, $x_i$, in the labeled sample set, $X_L$. By way of a non-limiting example, the content kernel may be denoted as $K_{content}(i, j) = \phi(x_i, x_j)$, where $\phi(\cdot, \cdot)$ represents a kernel function, which may be any kernel function. The content kernel denotes a relationship such that if two images share similar visual features, the two images are more likely to have similar semantics than two images that do not share similar visual features.

At step 404, a semantic kernel is built using a semantic feature vector for each sample, $x_i$, in the labeled sample set, $X_L$. The semantic kernel built in step 404 considers semantic correlations among samples. Since different annotations may be inter-dependent in a multi-label classification, the annotations may be predicted collectively. For example, an image is more likely than not to have the tag "sports" if the image also has the tag "NBA" or "basketball." Or conversely, an image is less likely than not to have a "sports" annotation, if the image is annotated with a tag "academy awards." By way of a non-limiting example, the semantic kernel may be denoted as $K_{semantic}(Y_i^k, Y_j^k) = \phi(Y_i^{\{-k\}}, Y_j^{\{-k\}})$, where $Y_i^{\{-k\}}$ represents a vector of the variables in a set $\{Y_i^p: p \neq k\}$. The semantic kernel denotes a relationship such that if two images share similar semantics, the two images are more likely than not to have similar values for any feature vector bit, e.g., the two images are more likely than not to have similar annotations and similar semantic feature vectors.

At step 406, a network kernel is built, e.g., using a network feature vector for each sample, $x_i$, in the labeled sample set, $X_L$. In accordance with one or more embodiments, the network kernel built in step 406 may consider the semantics of samples interrelated in the network, as such samples are usually inter-dependent in a network. By way of a non-limiting example, an image that depicts one or more individuals that also appear in one or more other images that have "politics" and/or "government" annotation(s) is likely to also have, or may appropriately be assigned, one or both of these tags. By way of a non-limiting example, the network kernel may be denoted as $K_{network}(Y_i^k, Y_j^k) = \phi(Y_{l \in N(i)}, Y_{l \in N(j)})$, where $Y_{l \in N(j)}$ denotes a set of vectors $Y_j(\forall_j \in N(i))$, where N(i) denotes an index set of related samples to the i-th sample, e.g., those sample(s) directly linked to the i-th sample. The network kernel may denote a relationship such that if neighbors of two images share similar semantics, the two images are more likely than not to have similar semantics.

Steps 402, 404 and 406 build a kernel on each of content, semantic and network relationship types, and the multiple kernels are used to build the MKML kernel. By way of a non-limiting example, a multi-kernel learner method may be used to learn weights, one corresponding to each of the individual kernels built in steps 402, 404 and 406, where each of the weights may be considered to represent an importance of its corresponding kernel.

A joint probability, e.g., weights associated with each of the content, semantic and social network kernels, may be modeled based upon the Markov property, such that if sample $x_i$ and $x_j$ are not directly connected in network G, the label set $Y_i$ is conditional independent from $Y_j$ given the label sets of $x_i$'s neighbors. A local conditional probability on label k may be modeled by a MKL learner with the kernels built in steps 402, 404 and 406. The computation of these kernels may be dependent on a predicted set, $Y_j(j \in N(i))$, containing the vectors of samples, $x_j$, related to sample, $x_i$, e.g., the related samples being those linked to sample, $x_i$, and a predicted $Y_i^{\{-k\}}$. A joint probability may be approximated based on these local conditional probabilities by treating different labels as independent and the samples as independent and identically distributed. Linear kernels may be used for each of the relations, e.g., content, semantic and network relations.

Figure 5A:
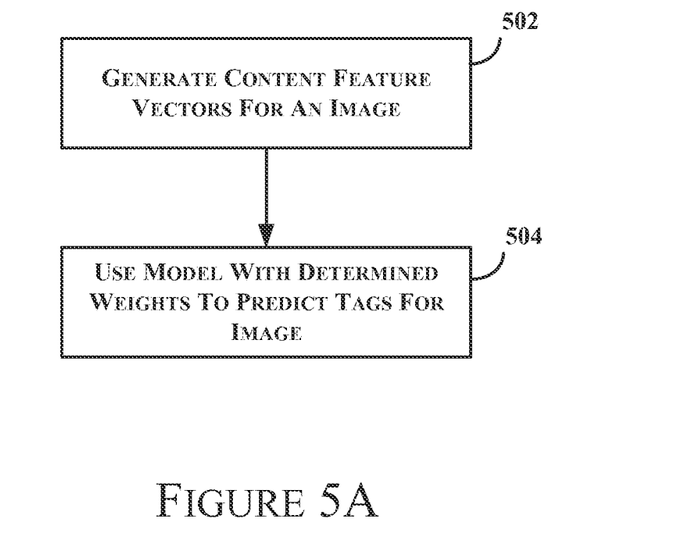
FIGS. 5A and 5B, illustrate process flows in which the MKML kernel is used to automatically identify image annotation(s) and relationships between individuals in accordance with one or more embodiments.
Figure 5B:
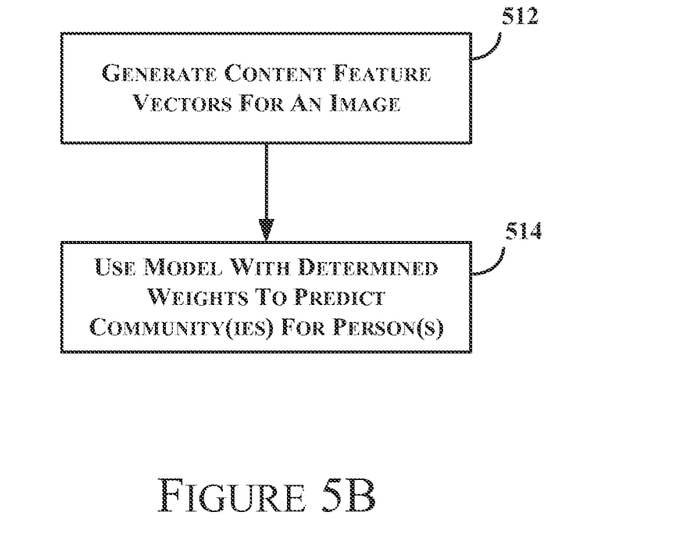

FIG. 5, comprising FIGS. 5A and 5B, illustrate process flows in which the learned MKML kernel is used to automatically identify image annotation(s) and relationship(s) between individuals, respectively, in accordance with one or more embodiments. In the example shown in FIG. 5A, an image's content feature vector is generated at step 502. At step 504, the image's content feature vector is used together with the learned MKML kernel to predict one or more annotations for the image, e.g., a semantic feature vector for the image. With reference to FIG. 5B, an image's content feature vector is generated at step 512, which content feature vector is used with the learned MKML kernel to predict a network related individuals, which may be represented as a network feature vector, at step 514.

Figure 6:
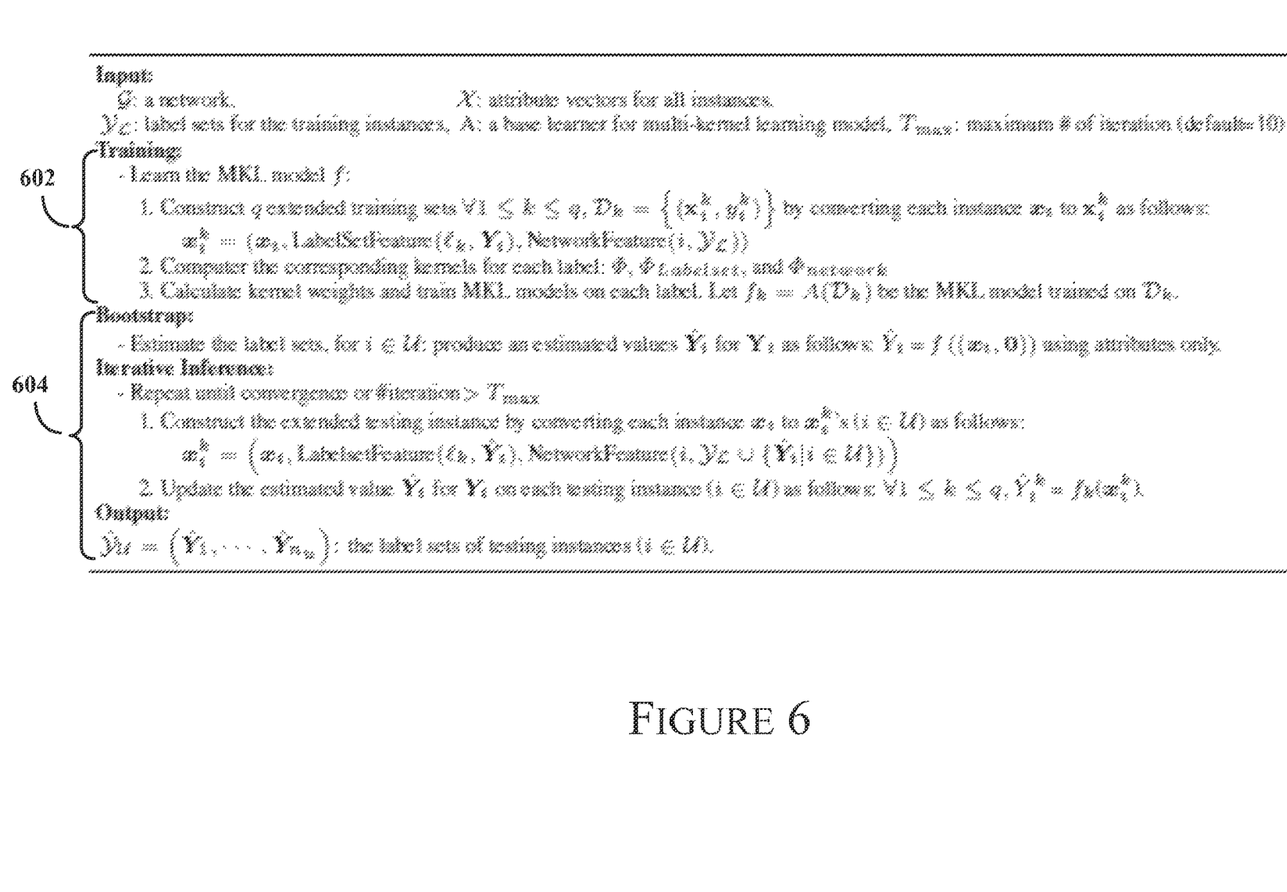
FIG. 6 provides an example of pseudocode for use in accordance with one or more embodiments of the present disclosure.

FIG. 6 provides an example of pseudocode for use in accordance with one or more embodiments of the present disclosure. Pseudocode 602 illustrates steps used in building, or training, a kernel function, f, for the MKML kernel using multi-kernel learning (MKL) and a labeled sample set. The steps of FIG. 4 correspond to the steps shown in pseudocode 602.

Pseudocode 604 illustrates steps that may be used in predicting the semantic and/or network relationships for one or more unlabeled samples. The steps may be used in identifying annotations, or tags, for images, such as in step 504 of FIG. 5A, and/or identifying a network for one or more individuals, such as in step 514 of FIG. 5B.

For pseudocode 604, an iterative classification algorithm (ICA) may be used as a framework for an inference procedure using a learned MKML kernel. Initially, semantic and network feature vectors of the unlabeled samples are unknown. A bootstrap step may be used to assign initial semantic and network feature vectors for each sample in the unlabeled sample set using the content features of each sample and a learned MKML kernel. In the example shown in FIG. 6, for each unlabeled, or test, sample (e.g., image), the content feature vector may have values representing the content features of the unlabeled, or test, image, and the semantic and network feature vectors for the sample may be initialized to zero.

Of course other strategies may be used in the bootstrapping process, such as and without limitation using training a kernel, a support vector machine (SVM) kernel, using training data comprising content feature data, and using the single kernel to assign initial label sets of unlabeled samples.

In any case, an iterative inference step may be used after the bootstrapping step to iteratively update the semantic and network feature vectors associated with images and iteratively update the content, semantic and/or network kernels. As part of the iterative process, the MKML kernel may be updated using the updated kernels. The iterative process may proceed for a specified maximum number of iterations or until a stabilized state is reached, e.g., the kernels and/or feature vectors reach a stabilized state, such that there is little if any change in the feature vectors and/or kernels, e.g., the content, semantic, network, and MKML kernels, between the present and previous iteration(s).

Figure 7:
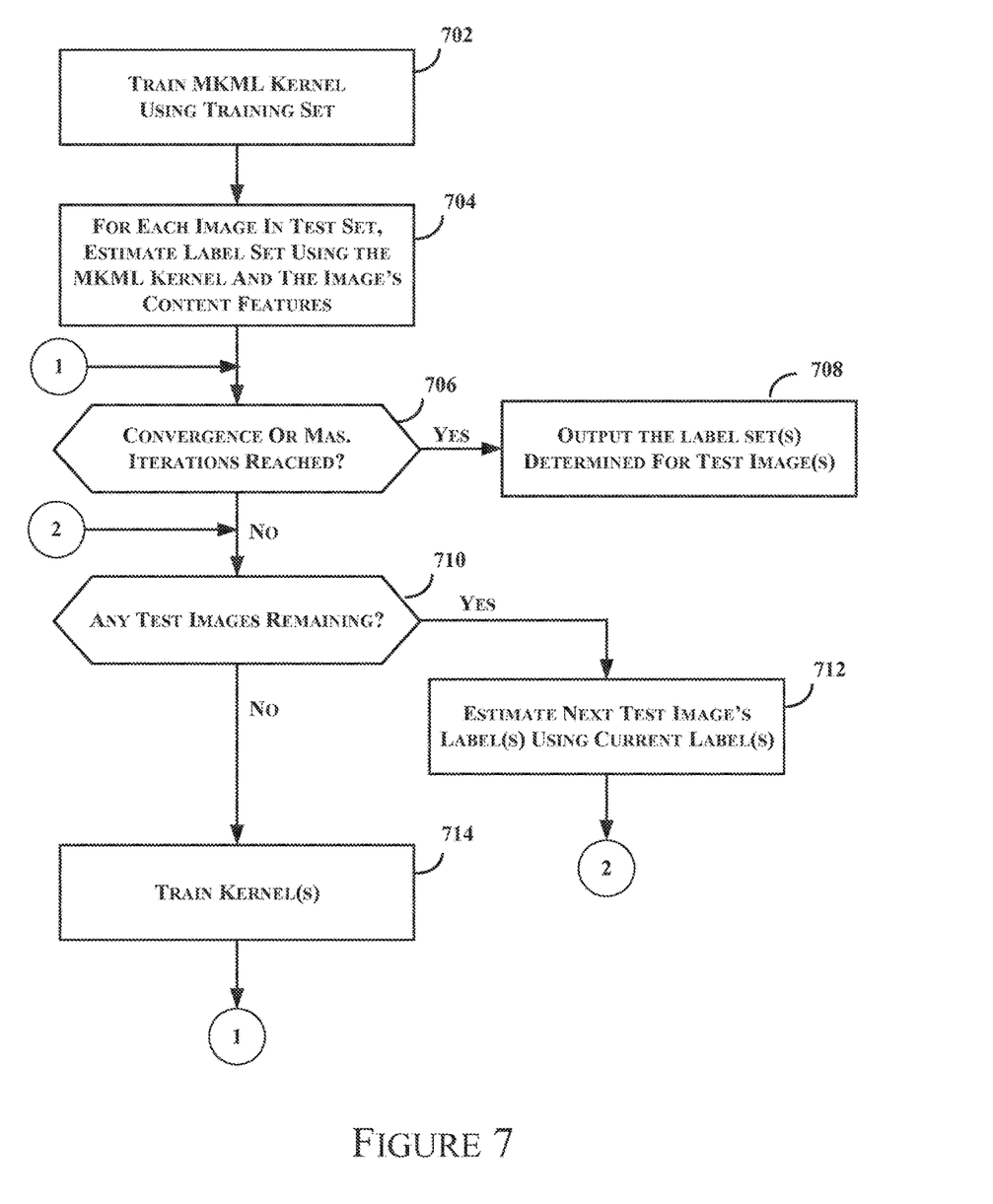
FIG. 7 provides a process flow of steps corresponding to pseudocode of FIG. 6 for use in accordance with one or more embodiments of the present disclosure.

FIG. 7 provides a process flow of steps corresponding to pseudocode of FIG. 6 for use in accordance with one or more embodiments of the present disclosure. At step 702, the MKML kernel is trained using a training data set, e.g., a labeled sample set. Step 702 may correspond to steps of FIG. 4 and pseudocode 602 of FIG. 6. The remaining steps of FIG. 7 may correspond to pseudocode 604 of FIG. 7.

At step 704, a content feature vector, which represents content features of an image, is used for each test image of an unlabeled sample set, together with an MKML kernel, to estimate, or predict, semantic and network feature vectors for each test image. At step 706, a determination is made whether to end the iterative process, e.g., if a maximum number of iterations is reached or a convergence of the kernel(s) is reached. If so, processing continues at step 708 to output the inferred, or predicted or estimated, semantic information and/or a network information for one or more individuals. The semantic output for a test image may identify a set of annotations for a test image. The network output may comprise a set of network relationships for one or more individuals, e.g., one or more individuals depicted in a test image.

If a determination is made, at step 706, to perform another iteration, processing continues at step 710 to determine if any test images remain to be processed in the current iteration. If not, processing continues at step 714 to update, e.g., retrain, the content, semantic and/or network kernels using the content, semantic and network feature vector predictions made for the test images, and to update, retrain, the MKML kernel. By way of a non-limiting example, the retraining may be performed using the steps of FIG. 4 and the content, semantic and network feature vectors predicted for the samples in the test sample set, for example. Processing continues at step 706 to determine whether to perform another iteration.

It a determination is made, at step 710, that there are test images remaining to be processed in the current iteration, processing continues to estimate a remaining test image's semantic and/or network feature vectors using the MKML kernel. Processing continues at step 710 to process any remaining test images.

By way of a non-limiting example, a MKML kernel trained in accordance with one or more embodiments of the present disclosure may be used to identify one or more annotations for one or more images. An image's tags may be used to make a recommendation of an image to a user. By way of a non-limiting example, an image that has an associated "soccer game" tag might be recommended to a user that is interested in soccer and/or soccer games. By way of another non-limiting example, one or more sports-related advertisements may be identified for a user that has uploaded, or otherwise is associated with, one or more images with tags related to sports.

Figure 8:
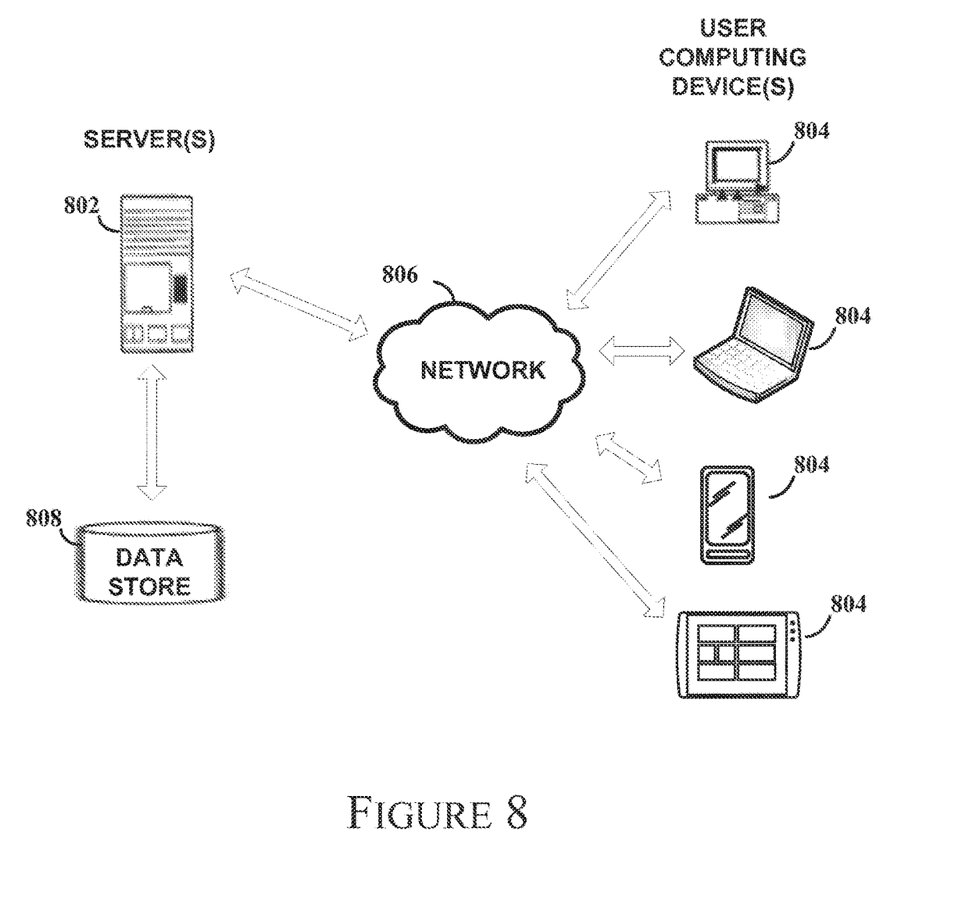
FIG. 8 illustrates some components that can be used in connection with one or more embodiments of the present disclosure.

FIG. 8 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 802 can be configured to execute program code, instructions, etc. to provide functionality in accordance with one or more embodiments of the present disclosure.

Computing device 802 can serve content to user computing devices 804 using a browser application via a network 806. Data store 808 can be used to store program code to configure a server 802 to execute functionality in accordance with one or more embodiments of the present disclosure, etc. Similarly, computing device 804 may store program code to configure the device 804 to execute functionality in accordance with one or more embodiments of the present disclosure, etc.

The user computing device 804 cats be any computing device, including without limitation a personal computer, personal digital assistant (PDA), wireless device, cell phone, internee appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 802 and the user computing device 804 can include one or more processors, memory, a removable media reader, network interface, display and interface, and one or more input devices, e.g., keyboard, keypad, mouse, etc. and input device interface, for example. One skilled in the art will recognize that server 802 and user computing device 804 may be configured in many different ways and implemented using many different combinations of hardware, software, or firmware.

In accordance with one or more embodiments, a computing device 802 can make a user interface available to a user computing device 804 via the network 806. The user interface made available to the user computing device 804 can include content items, or identifiers (e.g., URLs) selected for the user interface in accordance with one or more embodiments of the present invention. In accordance with one or more embodiments, computing device 802 makes a user interface available to a user computing device 804 by communicating a definition of the user interface to the user computing device 804 via the network 806. The user interface definition can be specified using any of a number of languages, including without limitation a markup language such as Hypertext Markup Language, scripts, applets and the like. The user interface definition can be processed by an application executing on the user computing device 804, such as a browser application, to output the user interface on a display coupled, e.g., a display directly or indirectly connected, to the user computing device 804.

In an embodiment the network 806 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 8. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 9:
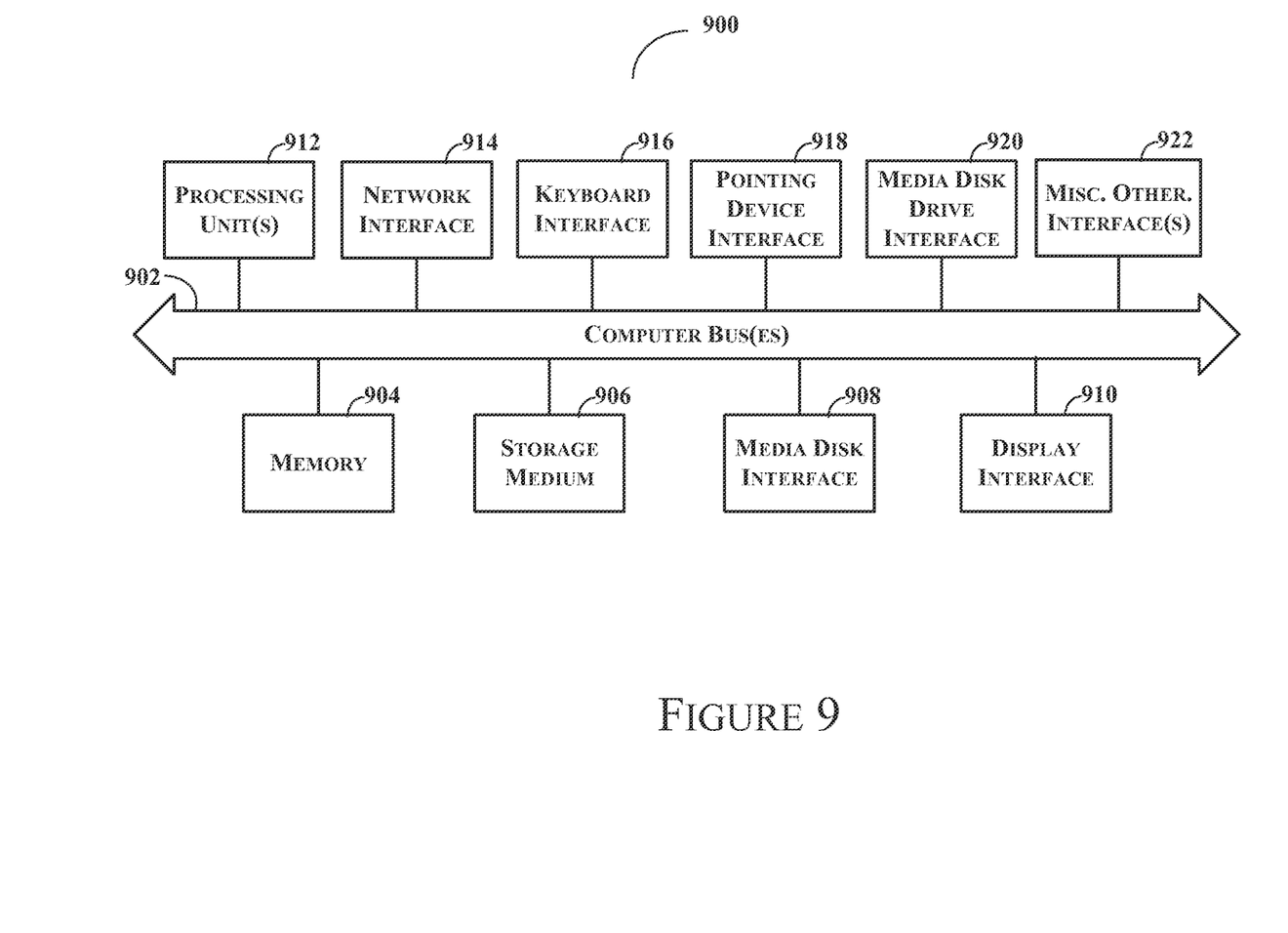
FIG. 9 is a detailed block diagram illustrating an internal architecture of a computing device in accordance with one or more embodiments of the present disclosure.

FIG. 9 is a detailed block diagram illustrating an internal architecture of a computing device, e.g., a computing device such as server 802 or user computing device 804, in accordance with one or more embodiments of the present disclosure. As shown in FIG. 9, internal architecture 900 includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), etc., media disk drive interface 920 as an interface for a drive that can read and/or write to media including removable media such as floppy, CD-ROM, DVD, etc. media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code, and/or computer-executable process steps, incorporating functionality described herein, e.g., one or more of process flows described herein. CPU 912 first loads computer-executable process steps from storage, e.g., memory 904, computer-readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   training, by at least one computing device, a machine-modeled kernel jointly modeling content, semantic information and social network information, the training comprising building the kernel using a content kernel trained using a training set comprising content feature information, a semantic kernel trained using semantic feature information of the training data set and a social network kernel trained using social network feature information of the training data set, an implicit social network determined from a plurality of content items is used in determining the social network feature information used in training the kernel;
   identifying, by the at least one computing device and using a number of content items other than the plurality of content items, a plurality of individuals depicted in the number of content items using the kernel;
   identifying, by the at least one computing device, a number of relationships, each relationship being between two individuals, of the plurality of individuals, identified in a same content item, of the number of content items, using the kernel; and
   representing, by the at least one computing device, each relationship, of the number of identified relationships, in an electronic social network comprising a plurality of nodes and a plurality of connections, each identified relationship being represented as a connection between a pair of individuals, of the plurality of individuals, identified in the same content item using the kernel and each individual of the pair being represented as a node of the plurality of nodes.

2. The method of claim 1, further comprising identifying at least one community comprising a number of individuals, of the plurality of individuals, identified as being connected using the kernel.

3. The method of claim 2, further comprising identifying a connection between at least two communities of individuals identified using the kernel, identification of the connection between the at least two communities being based on an occurrence of one or more individuals belonging to each community of the at least two communities.

4. The method of claim 2, at least one interest being assigned to each community of the at least one community.

5. The method of claim 1, further comprising determining, for the connection between the pair of individuals, a connection strength for the pair of individuals, determination of the connection strength being based on how many of the number of content items the pair of individuals is depicted in the same content item.

6. The method of claim 1, further comprising
   serving, by the at least one computing device and to a client computing device of a user via an electronic communications network, content, the serving of the content to the user computing device resulting in the content being output by the user computing device.

7. The method of claim 1, the trained kernel modeling relationships among content, semantic and social network features.

8. The method of claim 1, the content item's social network information identifying each individual represented in the content item.

9. The method of claim 1, the content item's semantic information identifying one or more annotations associated with the content item.

10. The method of claim 1, further comprising:
    training, by at least one computing device, the content kernel using at least the content feature information associated with each content item of the plurality of content items in the training set;
    training, by at least one computing device, the semantic kernel using at least the semantic feature information associated with each content item of the plurality of content items in the training set; and
    training, by at least one computing device, the social kernel using at least the social network feature information associated with each content item of the plurality of content items in the training set.

11. The method of claim 1, the kernel jointly modeling content, semantic and social network information comprising the content, semantic and social network kernels and a weighting for each of the content, semantic and social network kernels.

12. A non-transitory computer-readable storage medium tangibly encoded with computer-executable instructions that when executed by a processor associated with a computing device perform a method comprising:
    training a machine-modeled kernel jointly modeling content, semantic information and social network information, the training comprising building the kernel using a content kernel trained using a training set comprising content feature information, a semantic kernel trained using semantic feature information of the training data set and a social network kernel trained using social network feature information of the training data set, an implicit social network determined from a plurality of content items is used in determining the social network feature information used in training the kernel;

identifying, using a number of content items other than the plurality of content items, a plurality of individuals depicted in the number of content items using the kernel;

identifying a number of relationships, each relationship being between two individuals, of the plurality of individuals, identified in a same content item, of the number of content items, using the kernel; and representing each relationship, of the number of identified relationships, in an electronic social network comprising a plurality of nodes and a plurality of connections, each identified relationship being represented as a connection between a pair of individuals, of the plurality of individuals, identified in the same content item using the kernel and each individual of the pair being represented as a node of the plurality of nodes.

13. The non-transitory computer-readable storage medium of claim 12, further comprising identifying at least one community comprising a number of individuals, of the plurality of individuals, identified as being connected using the kernel.

14. The non-transitory computer-readable storage medium of claim 13, further comprising identifying a connection between at least two communities of individuals identified using the kernel, identification of the connection between the at least two communities being based on an occurrence of one or more individuals belonging to each community of the at least two communities.

15. The non-transitory computer-readable storage medium of claim 13, at least one interest being assigned to each community of the at least one community.

16. The non-transitory computer-readable storage medium of claim 12, further comprising determining, for the connection between the pair of individuals, a connection strength for the pair of individuals, determination of the connection strength being based on how many of the number of content items the pair of individuals is depicted in the same content item.

17. The non-transitory computer-readable storage medium of claim 12, further comprising serving, to a client computing device of a user via an electronic communications network, content, the serving of the content to the user computing device resulting in the content being output by the user computing device.

18. The non-transitory computer-readable storage medium of claim 12, further comprising:

training the content kernel using at least the content feature information associated with each content item of the plurality of content items in the training set;

training the semantic kernel using at least the semantic feature information associated with each content item of the plurality of content items in the training set; and training the social kernel using at least the social network feature information associated with each content item of the plurality of content items in the training set.

19. The non-transitory computer-readable storage medium of claim 12, the kernel jointly modeling content, semantic and social network information comprising the content, semantic and social network kernels and a weighting for each of the content, semantic and social network kernels.

20. A computing device comprising:

a processor;

a non-transitory storage medium for tangibly storing thereon program logic for execution by the processor, the program logic comprising:

training logic executed by the processor for training a machine-modeled kernel jointly modeling content, semantic information and social network information, the training comprising building the kernel using a content kernel trained using a training set comprising content feature information, a semantic kernel trained using semantic feature information of the training data set and a social network kernel trained using social network feature information of the training data set, an implicit social network determined from a plurality of content items is used in determining the social network feature information used in training the kernel;

identifying logic executed by the processor for identifying, using a number of content items other than the plurality of content items, a plurality of individuals depicted in the number of content items using the kernel;

identifying logic executed by the processor for identifying a number of relationships, each relationship being between two individuals, of the plurality of individuals, identified in a same content item, of the number of content items, using the kernel; and representing logic executed by the processor for representing each relationship, of the number of identified relationships, in an electronic social network comprising a plurality of nodes and a plurality of connections, each identified relationship being represented as a connection between a pair of individuals, of the plurality of individuals, identified in the same content item using the kernel and each individual of the pair being represented as a node of the plurality of nodes.

* * * * *